July 18, 1933.   M. TIBBETTS   1,918,573
DAMPING DEVICE FOR MOTOR VEHICLES
Filed Jan. 3, 1928
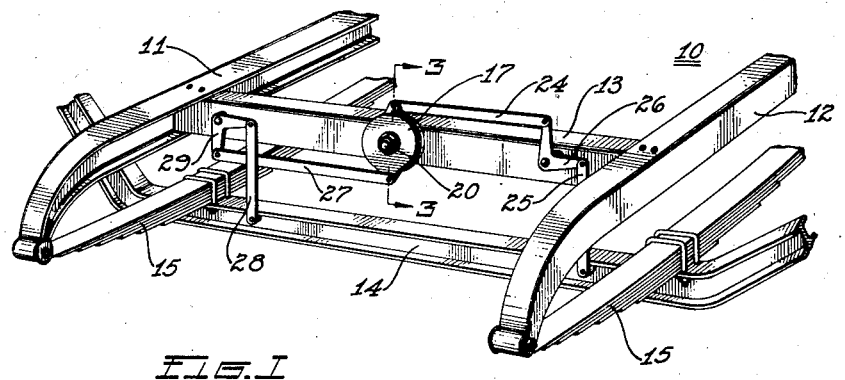
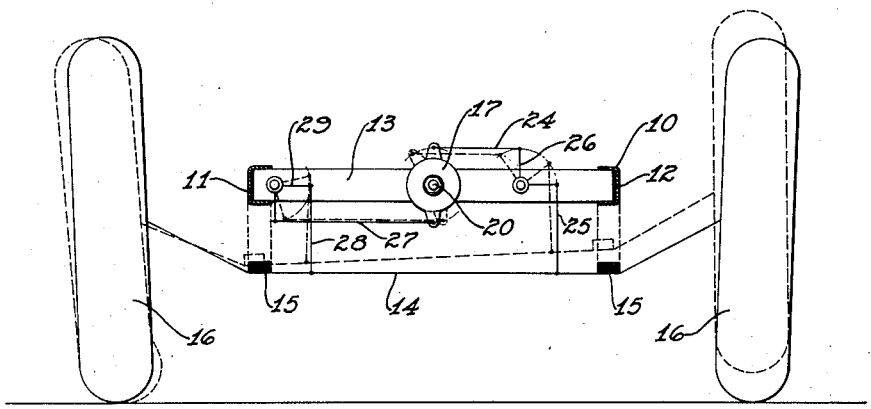
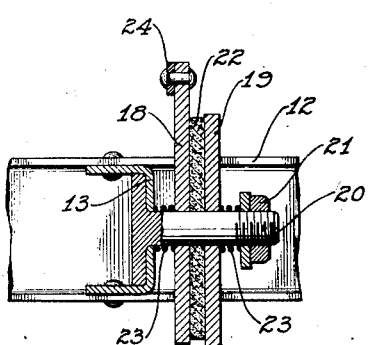
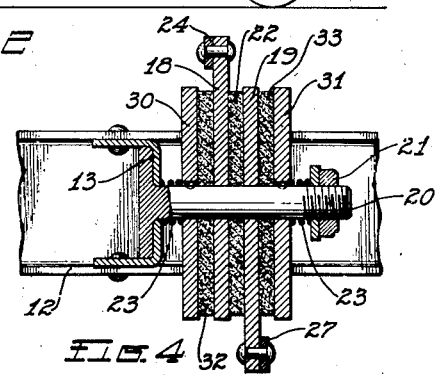
Inventor
Milton Tibbetts Patented July 18, 1933

1,918,573

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

DAMPING DEVICE FOR MOTOR VEHICLES

Application filed January 3, 1928. Serial No. 244,109.

This invention relates to motor vehicles and particularly to means for controlling the relative movement of the axle and frame to improve the riding qualities of the vehicle.

The use of low pressure tires on motor vehicles is responsible for the relatively rapid or violent vertical reciprocating movement of the front or steering wheels occurring at certain vehicle speeds and over certain types of road surfaces sometimes referred to in the art as "tramping" or "wheel shimmy". This movement of the steering wheels, which is usually accompanied by a lateral vibration thereof, is started or aggravated by unequal spring deflections on opposite sides of the front of the vehicle, such as by one end of the axle moving up or down relative to the vehicle frame more than the other end or by an up and down movement of one end of the axle relative to the frame followed by a similar movement of the other end, causing the front axle to have a substantially oscillatory movement in a vertical plane about its center.

Various devices have been employed for dampening this oscillatory movement or for eliminating it altogether by causing the axle to move only in parallel relation with respect to the frame. One of such devices employs a hydraulic shock absorber mounted at each end of the front axle and operatively connected to the frame, the shock absorbers being so interconnected by pipe lines adapted to convey liquid from one shock absorber to the other that the oscillatory movement of the front axle is damped or entirely eliminated. Usually in such hydraulic shock absorbers a working chamber substantially filled with liquid such as oil or glycerine has operable therein a piston which is caused to move in the liquid upon relative movement of the frame and axle, and the working chamber is provided with a relatively small passage to conduct the liquid therefrom to gradually relieve the resistance of the liquid to movement of the piston. In the interconnected hydraulic shock absorbers referred to, the interconnecting pipe line provides the relatively small passage for gradually relieving the resistance to movement of the piston and by employing such hydraulic means, any tendency toward relative movement of the frame and axle, except in parallel relation, will be resisted. Thus the hydraulic shock absorbing action is due to the resistance of the liquid to movement of the piston in the working chamber, the resistance being gradually relieved by the liquid being conducted from the working chamber through a relatively small passage.

It is one of the objects of the present invention to provide a friction shock absorbing or axle control means as distinguished from hydraulic means for damping "wheel shimmy" or "tramping" and to improve the riding qualities of a vehicle.

Another object of the invention is to so control by friction means, the spring deflections relative to each other or the movement of the axle ends relative to the frame, that the frame and axle will move relative to each other in substantially parallel relation regardless of the road surface over which the vehicle is traveling.

Another object of the invention is to provide friction means for resisting relative movement of a vehicle frame and axle in non-parallel relation to a greater extent than relative movement in parallel relation.

Another object of the invention is to provide friction means that will normally resist relative movement of the frame and axle of a vehicle in parallel relation while abnormally resisting any other relative movement of the frame and axle.

Other objects of the invention will appear from the following description taken in connection with the drawing forming a part of this specification, in which:

Fig. 1 is a view in perspective of the front end of a motor vehicle embodying the invention;

Fig. 2 is a diagrammatic view of the front end of a motor vehicle showing the relation of the parts of the friction means of the present invention when one of the wheels or one end of the axle is raised relative to the frame of the vehicle;

Fig. 3 is a sectional view of the frictional shock absorbing or axle control means, taken substantially on line 3—3 of Fig. 1, and Fig. 4 is a sectional view of a modified form of the frictional shock absorbing or axle control means.

Referring to the drawing, 10 represents generally the frame of a motor vehicle having side members 11 and 12 connected by a cross member 13. One of the axles of the vehicle is shown at 14, and in the embodiment selected for illustration, the front or steering axle is shown. The frame is supported on the axle by means of springs 15 connected to the axle by U-bolts. At the ends of the axle 14 are the usual steering knuckles, not shown, upon which are pivotally mounted the steering wheels 16.

The frictional shock absorbing or axle control means of the present invention comprises a plurality of frictionally related elements such as disks, indicated generally at 17 in Figs. 1 and 2, rotatably mounted on cross member 13. In the form shown in Fig. 3, the shock absorbing or axle control means comprises a pair of disks 18 and 19 rotatably mounted on cross member 13 by any suitable means such as by means of shaft 20 and nut 21. A frictional element such as disk 22 composed of any suitable frictional material is placed between disks 18 and 19 and may be either secured to one of the disks or freely mounted on shaft 20. The disks 18 and 19 are thus frictionally related and the friction developed upon relative movement thereof is dependent upon the pressure exerted by springs 23 bearing against the disks. Disks 18 and 19 are operatively connected to the axle at spaced points and in the form shown, disk 18 is connected adjacent one end of the axle by means of arms 24 and 25 operatively connected by bell crank 26 and disk 19 is connected adjacent the other end of the axle by means of arms 27 and 28 operatively connected by bell crank 29. The disks are preferably mounted in the center of cross member 13 and arms 25 and 28 are preferably connected to the axle at equal distances from the center thereof.

It will be noted that disks 18 and 19 are connected to their respective operating arms 24 and 27 at substantially diametrically opposed points, or in other words, that disk 18 is connected at one side of shaft 20 through arm 24 to the axle and that disk 19 is connected at the other side of shaft 20 through arm 27 to the axle. With this arrangement, it will be evident that relative movement of the frame and axle in parallel relation will cause the disks to move together in the same direction, or, expressed otherwise, if the end of the axle to which arm 25 is connected moves up or down relative to the frame to the same extent and in the same direction that the other end of the axle moves to which arm 28 is connected, arm 24 will rotate disk 18 and arm 27 will rotate disk 19 in the same direction and to the same extent. Thus disks 18 and 19 will not move relatively to each other and consequently no friction will be developed and no resistance will be offered to such movement of the axle relative to the frame. However, upon any tendency of the axle to oscillate relative to the frame, that is, for one end of the axle to move up or down relative to the frame more than the other end as shown diagrammatically in Fig. 2 or for one end to move up or down while the other end moves oppositely, the disks will be caused to move relatively to each other and the friction developed will resist any such movement of the axle. Oscillatory movement of the axle in a vertical plane about its center and consequently "tramping" or "wheel shimmy" will be damped.

In the form of the invention disclosed in Fig. 2, oscillatory movement of the axle is damped but movement of the axle in parallel relation to the frame is not resisted. To provide resistance to or shock absorbing effect in connection with movement of the axle in parallel relation to the frame, the form disclosed in Fig. 2 need be but slightly modified as shown in Fig. 4. The form disclosed in Fig. 4 is identical with the form shown in Fig. 2 except that a pair of disks 30 and 31 are keyed to shaft 20 in frictional relation to disks 18 and 19. In this instance also the friction elements such as disks 32 and 33 are composed of any suitable frictional material and may be either secured to an adjacent disk and else be mounted freely on shaft 20. Disks 18 and 19 in this form are connected to the vehicle axle in the same manner as are the corresponding disks in the form shown in Fig. 2. Thus upon movement of the axle in parallel relation to the frame, causing disks 18 and 19 to move together in the same direction so that no friction is developed between them, resistance will be offered to such movement by the relative movement of, and the friction developed between, disks 18 and 30 and disks 19 and 31. Thus in addition to the resistance offered to oscillatory movement of the axle, resistance is likewise offered to movement of the axle in parallel relation to the frame and the resistance offered to the oscillatory movement is greater than movement in parallel relation because in the former friction is developed between disks 18 and 19 to which is added the friction between disks 18 and 30 and disks 19 and 31 whereas in the latter no friction is developed between disks 18 and 19. Oscillatory movement of the axle is therefore resisted to a greater extent than movement thereof in parallel relation to the frame because more friction is developed in the former than in the latter movement.

In this way "tramping" or "wheel shimmy" is damped by frictional shock absorbing or axle control means. The shock absorbing action and axle control are obtained simply by the resistance developed between frictionally related parts operatively connected to the frame and axle of the vehicle.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, in combination, frame and axle members and shock absorbing or axle control means comprising a plurality of frictionally related elements mounted on one of said members, one of the elements being operatively connected to the other of said members and another of the elements also being operatively connected to the other of said members at a point spaced longitudinally of the axle from the point of connection of the first element.

2. In a motor vehicle, in combination, frame and axle members and shock absorbing or axle control means comprising a pair of frictionally related elements mounted on one of said members, and means connecting each of said elements to the other of said members so that relative movement of said members in parallel relation will cause said elements to move in unison and other movement of said members will cause said elements to move relatively to each other.

3. In a motor vehicle, the combination with frame and axle members, of frictionally related elements mounted on one of said members and connected in spaced relation to the other of said members, said mounting and said connections tending always toward, but not mechanically forcing, a movement in parallel relation of the frame and the longitudinal axis of the axle.

4. In a motor vehicle, the combination with frame and axle members, of friction means comprising a pair of inner disks and a pair of outer disks all frictionally related and mounted on one of said members, said inner pair of disks being connected in spaced relation to the other of said members and said outer pair of disks being fixed with respect to the member upon which they are mounted.

5. In a motor vehicle, the combination with frame and axle members, of means comprising a plurality of frictionally related disks mounted on one of said members, certain of said disks being connected in spaced relation to the other of said members and other of said disks being fixed with respect to the member upon which they are mounted, whereby relative movement of the frame and axle members in parallel relation is resisted to a certain extent, but relative movement in non-parallel relation is resisted to a greater extent.

6. In a motor vehicle, the combination with the frame and axle, of friction means associated with the frame and axle, and connections between said means and said frame and axle, said means and its connections tending always toward but not mechanically forcing, a movement in parallel relation of the frame and the longitudinal axis of the axle.

7. In a motor vehicle, the combination with the frame and axle, of friction means associated with the frame and axle, separate connections between parts of said friction means and the axle, said connections to the friction means parts being such that relative movement may be imparted to the friction means parts, and the connections to the axle being such that relative movement of the frame and axle in parallel relation will not cause relative movement of said friction means parts but relative movement of the frame and axle in non-parallel relation will cause relative movement and consequent friction between the parts of said friction means.

8. In a motor vehicle, the combination with the frame and axle, of friction means associated with the frame and axle, connections between parts of said friction means and the frame, connections between other parts of said friction means and the axle, said connections to said parts being such that relative movement may be imparted to the friction means parts, and the connections to the frame and axle being such that relative movement of the frame and axle in parallel relation will cause certain relative movement and consequent friction of said friction means parts and relative movement of the frame and axle in non-parallel relation will cause additional relative movement and consequent increased friction between the parts of said friction means.

9. In a motor vehicle, the combination with the frame and axle, of friction means mounted on the frame and having friction creating relatively movable parts, connections from some of said parts to the frame, and connections from others of said parts to the axle at separated points longitudinally of the axle, said latter connections causing some of the parts to move in unison as the separated points of the axle move together, and to move relatively as the separated points move relatively, whereby a greater movement of one end of the axle relatively to the frame will create a greater frictional resistance than the same movement of both ends of the axle relatively to the frame.

10. In a motor vehicle, the combination with the frame and axle means, of friction means connected to the frame and axle means to resist relative movement therebetween, said friction means being so constructed and so connected to the frame and axle means as to offer resistance to relative movement of the frame and axle means in parallel relation and greater resistance to relative movement of the frame and axle means in non-parallel relation.

11. In a motor vehicle, the combination with the frame and axle, of friction means associated with the frame and axle and having friction creating relatively movable parts, a connection between one of said parts and a portion of the axle so that said part is moved as that portion of the axle moves relatively to the frame, a connection between another of said parts and another portion of the axle to cause said other part to move coincidently with the first said part as said other portion of the axle moves coincidently with the first said portion thereof whereby as said parts move together there will be no relative movement and consequently no friction, but when said parts move differently as by differing movements of the respective portions of the axle friction will be created and the differing movements resisted.

12. In a motor vehicle, the combination with the frame and axle, of friction means associated with the frame and axle and having friction creating relatively movable parts, a connection between one of said parts and a portion of the axle so that said part is moved as that portion of the axle moves relatively to the frame, a connection between another of said parts and another portion of the axle to cause said other part to move coincidently with the first said part as said other portion of the axle moves coincidently with the first said portion thereof whereby as said parts move together there will be no relative movement and consequently no friction, but when said parts move differently as by differing movements of the respective portions of the axle friction will be created and the differing movements resisted, and additional friction creating means operatively connected with said parts to create friction as said parts are moved both relatively and together.

13. In a motor vehicle, the combination with the frame and axle means, of axle movement dampening means connected to the frame and axle means to resist relative movement therebetween, said axle movement dampening means being so constructed and so connected to the frame and axle means as to offer resistance to the relative movement of the frame and axle means in parallel relation and greater resistance to relative movement of the frame and axle means in non-parallel relation.

In testimony whereof I affix my signature.

MILTON TIBBETTS.